United States Patent [19]

Paulsen

[11] Patent Number: 4,802,720
[45] Date of Patent: Feb. 7, 1989

[54] FLEXURAL PIVOT

[76] Inventor: Dean R. Paulsen, 918 Belmont St., Watertown, Mass. 02172

[21] Appl. No.: 68,637

[22] Filed: Jun. 30, 1987

[51] Int. Cl.⁴ .............................................. G02B 26/10
[52] U.S. Cl. ...................................... 350/6.6; 350/486
[58] Field of Search .................. 350/6.6, 6.5, 6.1, 486, 350/487; 358/206

[56] References Cited

U.S. PATENT DOCUMENTS

| | | | |
|---|---|---|---|
| 3,087,373 | 4/1963 | Poor et al. | 350/6.6 |
| 3,671,766 | 6/1972 | Howe | 350/6.6 |
| 4,129,930 | 12/1978 | Dragt | 350/486 |
| 4,708,420 | 11/1987 | Liddiard | 350/6.6 |

Primary Examiner—John K. Corbin
Assistant Examiner—Loha Ben

[57] ABSTRACT

A flexural member (54) in a flexural pivot is secured by a mounting member (50) to a cylindrical shell (48). The flexural member extends through an aperture (58) in an armature (44), to which it is attached by a clamp (62) that clamps one end of the pivot member (54) and is fastened by bolts (86) to the armature (44). By locating the armature (44) and the bolts (86) near the middle of the flexure member (54) rather than toward its end, the moment of inertia of the system is minimized, and its resonant frequency is thus maximized.

4 Claims, 3 Drawing Sheets

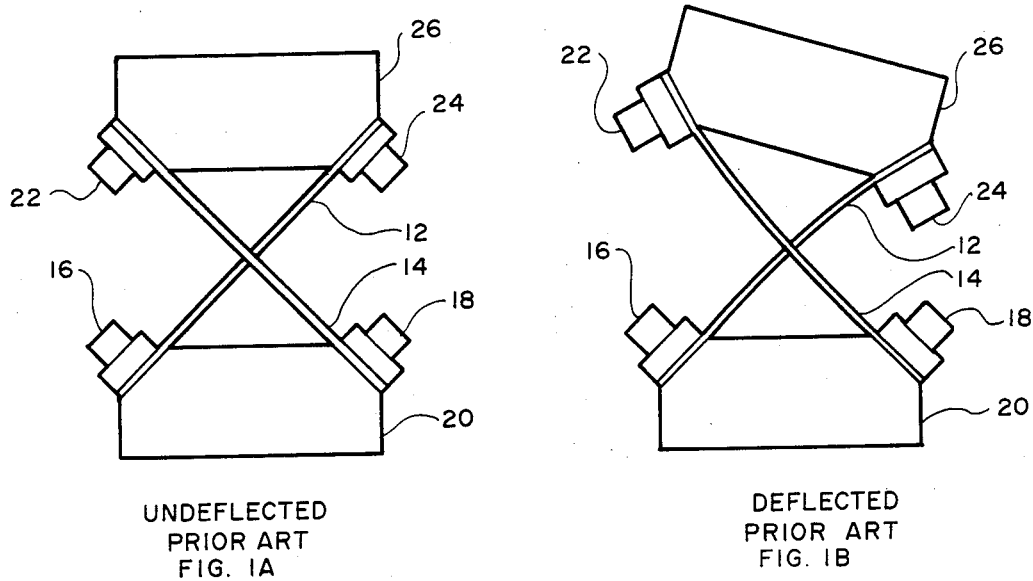
UNDEFLECTED
PRIOR ART
FIG. 1A
DEFLECTED
PRIOR ART
FIG. 1B
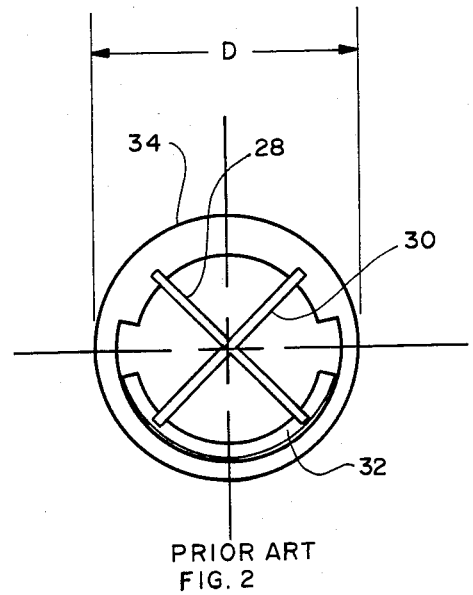
PRIOR ART
FIG. 2

FLEXURAL PIVOT

BACKGROUND OF THE INVENTION

The present invention is directed to flexural pivots and has particular, although not exclusive, application to pivots used in scanners.

In some laser printers, a modulated laser beam is deflected by an oscillating mirror so that deflected beam scans back and forth across a charge-bearing surface that is subsequently used to impart an image to paper or some other medium. The mirror is mounted on an armature secured to a flexural pivot, a device that includes flexure members that deflect when the armature pivots. The armature-flexure system constitutes a high-Q resonant system into which energy is imparted by a magentic driver. This apparatus is referred to as an optical scanner.

One type of flexural pivot employed in scanners is llustrated in FIGS. 1A and 1B. Two flexure members 12 and 14 are secured at their lower ends by bolts 16 and 18 to a stationary base 20. Similar bolts 22 and 24 secure their upper ends to an armature 26, on which is mounted a mirror (not shown). FIG. 1A depicts the undeflected state of the flexural pivot, while FIG. 1B depicts a deflected state. The length of the flexure members 12 and 14 are chosen to achieve the desired deflection within the elastic limits of the material from which the flexure member is made. By orienting the two flexure members 12 and 14 at angles to each other, a cross-axis stiffness is achieved that is greater than that which would result if the planes of the flexure members 12 and 14 coincided.

In order to give the scanner system a high resonant frequency, the ratio of torsional stiffness to inertia must be high. In this regard, the bolts 22 and 24 detract significantly from the resonant frequency, since the inertia that they add is significant. FIG. 2 depicts a design that eliminates these bolts. In this design, the flexure members 28 and 30 are embedded in slots in an arcuate base 32 and soldered into place. The armature 34 is cylindrical, and the other ends of the flexure members 28 and 30 are similarly embedded and soldered into slots in the armature. This design eliminates the inertia penalty of the nuts, but the cylindrical armature 34 contributes its own inertia penalty.

It is an object of the present invention to increase the resonant frequency that can be achieved through the use of a flexural pivot.

SUMMARY OF THE INVENTION

The foregoing and related objects are achieved in a flexural pivot in which the armature is located in a position that is spaced from the translating end of the flexure member. A clamp member clamps onto the translating end of the flexure member and is attached to the armature by a fastener. The force that the fastener applies deflects the clamp to provide the clamping force required to hold the clamp on the flexure member. Because of this arrangement, the armature can be disposed at a location in which it contributes least to the moment of inertia of the system, and the fastening means, which is responsible for the force that clamps the translating end of the flexure member, can be similarly positioned. In this way, the resonant frequency of the resonant scanner or other device in which the flexural pivot is included is significantly increased.

The invention is defined with more particularity in the accompanying claims.

BRIEF DESCRIPTION OF THE DRAWINGS

These and further features and advantages of the present invention, as well as features of prior art arrangements, are described in connection with the accompanying drawings, in which:

FIGS. 1A and 1B depict a prior-art flexural-pivot arrangement;

FIG. 2 depicts another prior-art arrangement;

DETAILED DESCRIPTION OF AN ILLUSTRATIVE EMBODIMENT

Figure 3:
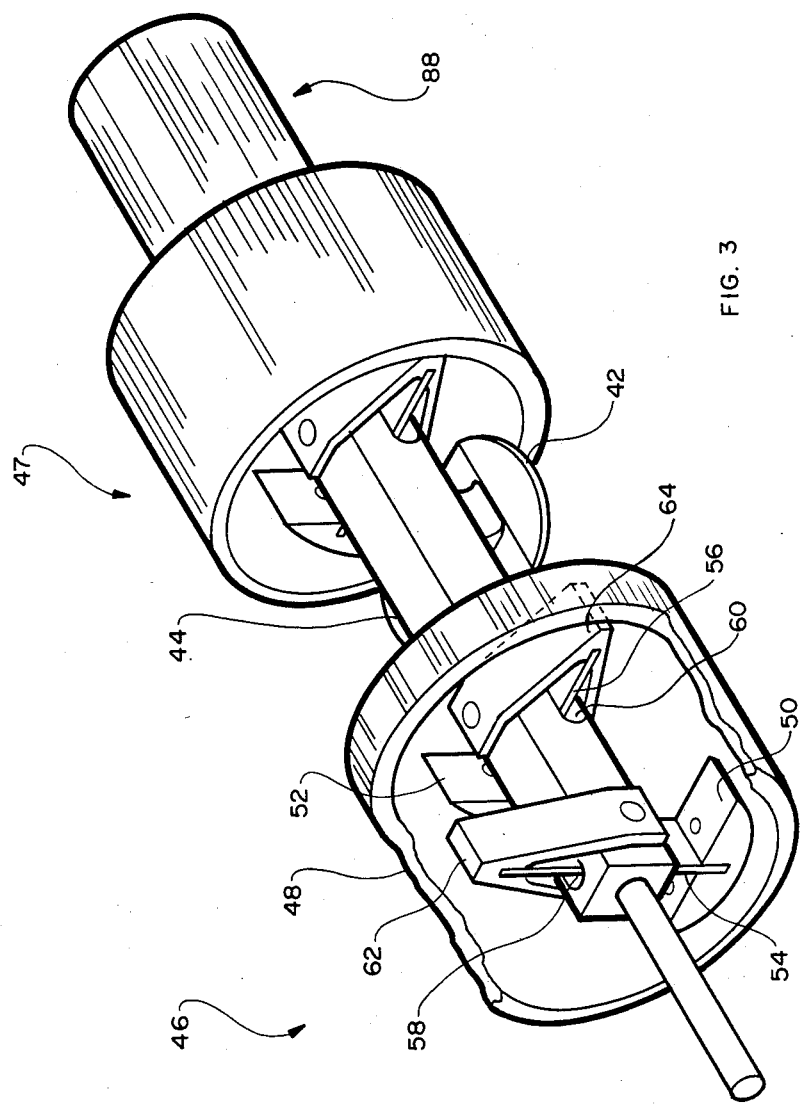
FIG. 3 depicts a resonant scanner employing flexural pivots that embody the present invention.

FIG. 3 depicts a scanner 40, in which a mirror 42 for deflecting a laser beam is mounted on an armature 44. The armature 44 is in turn mounted in identical flexural pivots 46 and 47 that embody the present invention. Flexural pivot 46 includes a cylindrical base or shell 48 through which the armature 44 extends. To the inner surface of the shell 48 are secured two mounting members 50 and 52, in which flexure members 54 and 56, respectively, are embedded. The flexure members 54 and 56 are oriented at right angles to each other and extend through apertures 58 and 60 in the armature 44. The apertures 58 and 60 are large enough that the flexure members 54 and 56 do not touch the armature 44 during flexure. Clamps 62 and 64 secure the flexure members 54 and 56, respectively, to the armature 44, as will be described in more detail in connection with FIG. 4.

Figure 4:
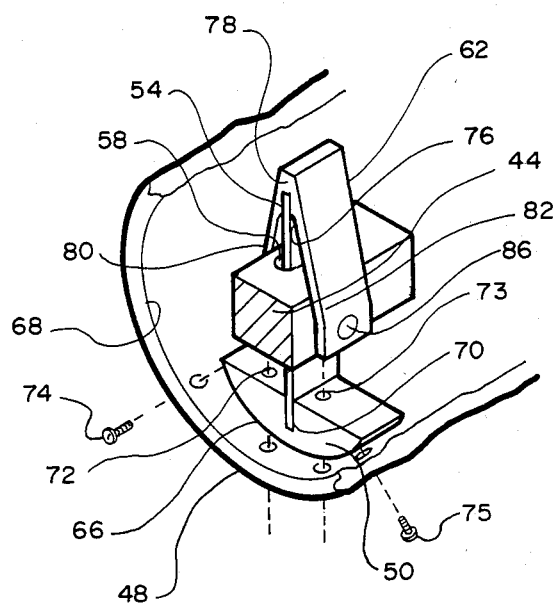
FIG. 4 is a detailed isometric view of a portion of the flexural pivot of the present invention.

FIG. 4 shows one of the mounting members 50 with an arcuate lower surface 66 that is complementary to the interior shell surface 68. The upper surface of mounting member 50 has a slot 70 that receives pivot member 54. Bolts (not shown) extending through holes 72 and 73 fasten the mounting member 50 to the cylindrical base 48. Set screws 74 and 75 threadedly engage tapped holes in the shell 48. When these set screws are tightened, they deform the mounting member 56 slightly so that slot 70 tends to reduce in width and thus clamp flexure member 54 securely in position.

Flexure member 54 extends through a wide aperture 58 in the armature 44, as was indicated above. Accordingly, rather than being positioned at the translating end of the flexure member 54, the armature is located closer to its middle, which is approximately the pivot axis of the flexural pivot. The clamp member 62 that holds its in this position has a slot 76, similar to slot 70, in a joint region 78 at which two clamp arms 80 and 82 meet. The arms 80 and 82 extend down along opposite sides of the armature 44, and the clamp member 62 is formed so that the distance between the arms 80 and 82 is a little greater than the width of the armature 44. A bolt 86 and another bolt, not visible, fasten the arms 80 and 82 to the armature 44. In doing so, they deform the clamp member 62 so that its slot 76 closes down and clamps onto the flexure member 54.

The flexure members 54 and 56 can conveniently be made of ordinary spring steel. In the illustrated embodiment, the spring steel is of uniform thickness. This differs from many arrangements in which flexure members are provided with contours at clamping interfaces at which stresses tend to be concentrated. I have found that this relatively expensive contouring can be avoided if a soft metal, such as aluminum, is used for the mounting member 50 and clamp member 62.

In operation, a driver 88 (FIG. 3) applies an alternating torque to the armature 44 to pivot it about its longitudinal pivot axis. Pivoting of the armature 44 from the rest position depicted in the drawings results in a restoring torque from the flexure members 54 and 56, and the armature 44 thereby oscillates about its pivot axis. The ends of the flexure members translate significantly as they are flexed, but the movement of each is constrained by the movement of the other in such a manner that there is little translation of the armature 44; its motion is predominantly pivotal. As a consequence, the contribution of the armature mass to the moment of inertia of the system is nearly as small as is possible.

For the same reason, bolt 86 and its undepicted counterpart bolt aslo contribute only minimally to the moment of inertia of the system. This is true even though those bolts act to apply a clamping force to the outer ends of the flexure members 54 and 56, which are the parts that translate the most during flexure. Accordingly, the deflection of the entire flexure-member length contributes to the amplitude of the armature deflection, but the pivot design avoids the moment-of-inertia penalty that would be caused by locating the armature and fastening elements at the ends of the flexure members.

It is apparent that the flexural pivot of the present invention provides significant advantages in optical scanners; the deflection of a long pivot member is obtained without an excessive moment of inertia, so both the deflection amplitude and the resonant frequency of the system can be quite high. It is also evident that the flexural pivot of the present invention can also be used advantageously in many types of devices in addition to scanners. Accordingly, the present invention constitutes a significant advance in the art.

What is claimed is:

1. A scanner comprising:
   A. a base;
   B. a first elongated flexure member having first and second ends and a longitudinal axis, being secured to the base at its first end, and being adapted for flexure along its longitudinal axis to translate its second end;
   C. an armature having a pivotal axis and adapted to pivot about its pivot axis;
   D. a first clamp member for securing the second end of the first flexure member to the armature so that the armature pivots about its pivot axis when the first flexure member flexes along its longitudinal axis, the first clamp member forming a joint region and a pair of arm regions extending from the joint region, the joint region forming a recess receiving the second end of the first flexure member and being deformable by flexure of the arm regions toward each other to clamp the second end of the first flexure member; and
   E. first fastening means, spaced from the second end of the first flexure member, for securing the arm regions of the first clamp member to the armature to support the armature at a position spaced from the second end of the first flexure member and to deflect the arm regions of the first clamp member toward each other to clamp the second end of the first flexure member in the recess, whereby the first fastening means acts to secure the second end of the first flexure member to the first clamp member without being positioned at the second end of the first flexure member.

2. A scanner as defined in claim 1 further including:
   A. a second flexure member, the second flexure member having first and second ends and a longitudinal axis, being secured to the base at its first end, extending at an angle to the first flexure member, and being adapted for flexure along its longitudinal axis to translate its second end;
   B. a second clamp member for securing the second end of the second flexure member to the armature so that the armature pivots about its pivot axis in a position in which the translation of the armature is substantially less than that of the second ends of the first and second flexure members when the first and second flexure members flex along their longitudinal axes, the second clamp member forming a joint region and a pair of arm regions extending from the joint region, the joint region forming a recess receiving the second end of the second flexure member and being deformable by flexure of the arm regions toward each other to clamp the second end of the second flexure member; and
   C. second fastening means, spaced from the second end of the second flexure member, for securing the arm regions of the second clamp member to the armature to support the armature and to deflect the arm regions of the second clamp member toward each other to clamp the second end of the second flexure member in the recess in the second clamp member.

3. A scanner as defined in claim 2 wherein:
   A. the armature forms first and second apertures therethrough; and
   B. the first and second flexure members extend through the first and second apertures, respectively.

4. A scanner as defined in claim 1 wherein:
   A. the armature forms a first aperture therethrough; and
   B. the first flexure member extends through the first aperture.

* * * * *